US008279161B2

(12) United States Patent
Hsu et al.

(10) Patent No.: US 8,279,161 B2
(45) Date of Patent: Oct. 2, 2012

(54) BACKLIGHT DRIVING METHOD

(75) Inventors: Ya-Ting Hsu, Hsin-Chu (TW); Fang-Cheng Lin, Hsin-Chu (TW); Yi-Pai Huang, Hsin-Chu (TW); Han-Ping D. Shieh, Hsin-Chu (TW); Chien-Hung Chen, Hsin-Chu (TW); Chi-Mao Hung, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 798 days.

(21) Appl. No.: 12/146,809

(22) Filed: Jun. 26, 2008

(65) Prior Publication Data

US 2009/0091525 A1 Apr. 9, 2009

(30) Foreign Application Priority Data

Oct. 3, 2007 (TW) ............................... 96137168 A

(51) Int. Cl.
*G02F 1/133* (2006.01)

(52) U.S. Cl. ............ 345/102; 345/88; 345/90; 345/204; 362/97.1; 362/97.2

(58) Field of Classification Search .................. 345/102, 345/87–89, 98–100, 690, 204; 349/106; 362/561, 97.1–97.3
See application file for complete search history.

(56) References Cited

U.S. PATENT DOCUMENTS 6,570,554 B1 * 5/2003 Makino et al. ................ 345/102
6,803,894 B1 10/2004 Hirota et al.
6,984,040 B2 1/2006 Childers
7,002,539 B2 2/2006 Shimada
7,391,407 B2 6/2008 Kim
7,483,095 B2 1/2009 Roth et al.
7,495,722 B2 * 2/2009 Roth et al. .................... 349/106
7,593,007 B2 9/2009 Wu et al.
7,852,326 B2 12/2010 Lin et al.
8,179,502 B2 5/2012 Roth et al.
2003/0058210 A1 * 3/2003 Yamazaki et al. .............. 345/88
2005/0116922 A1 * 6/2005 Kim .............................. 345/102

(Continued)

FOREIGN PATENT DOCUMENTS

CN 1641739 A 7/2005

(Continued)

OTHER PUBLICATIONS

English translation of abstract and pertinent parts of TW 200609616 A, Publication date: Mar. 16, 2006, TW.

(Continued)

*Primary Examiner* — Lun-Yi Lao
*Assistant Examiner* — Md Saiful A Siddiqui
(74) *Attorney, Agent, or Firm* — Thomas, Kayden, Horstemeyer & Risley, LLP

(57) ABSTRACT

A backlight driving method, which provides three kinds of light sources comprising a red light source, a blue light source, and a green light source. The driving method includes dividing a frame into four sub-frames, and lighting the green light sources twice during two sub-frames respectively, dividing the first frame and the second frame into four sub-frames respectively, lighting the four light sources in the four sub-frames in a first lighting order during the first frame, and lighting the four light sources in the four sub-frames using a second lighting order during the second frame, wherein the first order is different from the second order.

5 Claims, 5 Drawing Sheets

U.S. PATENT DOCUMENTS

| | | | | |
|---|---|---|---|---|
| 2005/0146492 | A1 | 7/2005 | Baba et al. | |
| 2006/0146007 | A1 | 7/2006 | Lim et al. | |
| 2007/0046914 | A1 | 3/2007 | Lee | |
| 2007/0176943 | A1* | 8/2007 | Cho | 345/589 |
| 2007/0230207 | A1* | 10/2007 | Shin et al. | 362/561 |
| 2009/0295844 | A1 | 12/2009 | Wu et al. | |
| 2011/0037929 | A1 | 2/2011 | Roth et al. | |

FOREIGN PATENT DOCUMENTS

| | | | |
|---|---|---|---|
| CN | 101002249 | A | 7/2007 |
| TW | 200606492 | A | 2/2006 |
| TW | 200609616 | A | 3/2006 |

OTHER PUBLICATIONS

English translation of abstract and pertinent parts of CN 1641739 A, Corresponding US Patent US 7,391,407; Jun. 24, 2008.

English translation of abstract and pertinent parts of TW 200606492 A, Aug. 3, 2004, Corresponding US Patent US 7,593,007; Sep. 22, 2009.

English translation of abstract and pertinent parts of CN 101002249 A, Corresponding US Patent US 7,483,095; Jan. 27, 2009.

English translation of abstract and pertinent parts of TW 200526044 A, Corresponding patent US 6,984,040; Jan. 10, 2006.

* cited by examiner

BACKLIGHT DRIVING METHOD

RELATED APPLICATIONS

This application claims priority to Taiwan Application Serial Number 96137168, filed Oct. 3, 2007, which is herein incorporated by reference.

BACKGROUND OF THE INVENTION

1. Field of the Invention

The present invention generally relates to a backlight driving method, in particular to the driving method of the color field sequential display.

2. Description of Related Art

Mixing the colors by opening single light sources one at a time creates the conventional color field sequential of a color image on a liquid crystal display. As shown in FIG. 1A, the frame 11 is divided into a first subframe 111, a second subframe 113 and a third subframe 115. The red light source within the first subframe 111 is turned on, the green light source within the second subframe 113 is turned on and the blue light source within the third subframe 115 is turned on. The three color light sources in the second frame 12 and the third frame 13 can be turned on in the same order as described in the previous sentence.

The method compared with conventional driving method of a display with colour filter has the following advantages: higher resolution; fewer driving circuit chips are used; colour balance; and space is saved by not using a color filter.

However the colour field sequential still has the problem of colour break-up. The light provided within three continuous subframes is transmitted to the human eye. Different colour light from the pixels are projected on the correct position will get the same image on the retina so that the colour information of each pixel can be completely reproduced. If one component of the pixel light source is projected to the wrong position, the observer will receive a distorted image and colour break-up occurs.

As shown in FIG. 1B, the display is the conventional color field sequential driving method and observer traces the white vertical light bar on the display area 14 when the bar is moving on the black background. However, if one of the RGB light components of the image from the subframes is projected to the wrong position on the retina, colour break-up will be occurred at the edge of the white vertical light bar 14.

As shown in FIG. 1C, from the simulation of the human eye's retina, the non-white colour region can be found at the left edge 151 of the light bar 14 and the right edge 153 of the light bar 14. Apart from lowering the quality of the images, research has found that colour break-up can induce dizziness in an observer when the observer focuses on the image for a long period of time. Therefore, the problems described above must be solved for the colour field sequential method.

SUMMARY OF THE INVENTION

One of the objectives of the invention is to solve the colour field sequential flicker and to reduce colour break-up. To do this, the current invention discloses a driving method of a backlight which comprises a first light source, a second light source, and a third light source. The disclosed driving method comprises three continuous frames each frame having four subframes as a lighting period; and lighting the first light source, the second light source and the third light source in order during the lighting period.

The invention provides another embodiment. A backlight driving method, the backlight having a red light source, a blue light source, a green light source, and a compensational light source, comprises: dividing the first frame, the second frame, the third frame and the fourth frame into four subframes individually; and lighting the four light sources in the four subframes in accordance with a first lighting order within the first frame, lighting the four light sources in the four subframes in accordance with a second lighting order within the second frame, and lighting the four light sources in the four subframes in accordance with a third lighting order within the third frame, wherein the first order, the second order and the third order are different to each other.

The invention provides another embodiment. A backlight driving method which provides a red light source, a blue light source, and a green light source and comprises: dividing the first frame and the second frame into four subframes individually, wherein the backlight lights the green light source twice within one frame; and lighting the three light sources in the four subframes in a first lighting order within the first frame, lighting the three light sources in the four subframes in a second lighting order within the second frame, wherein the first order and the second order are different to each other.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the invention, the field sequence in the adjacent frame is changed to the colour band induced by the colour break-up in every frame. And the method also changes the periodic property of the colour break-up to reduce the notice of the problem by human eye.

Figure 1A:
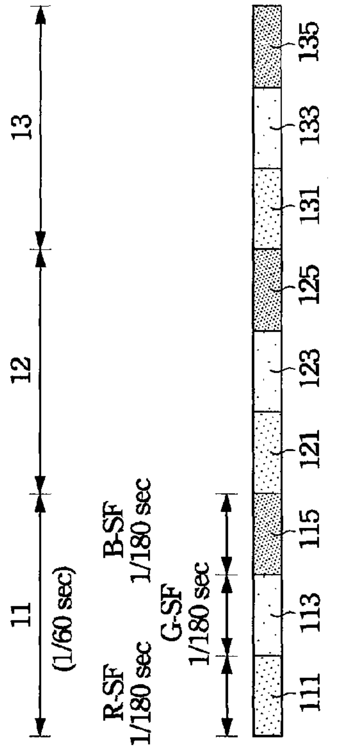
Fig. 1A (PRIOR ART)
FIG. 1A is a diagram of a conventional color field sequential.
Figure 1B:
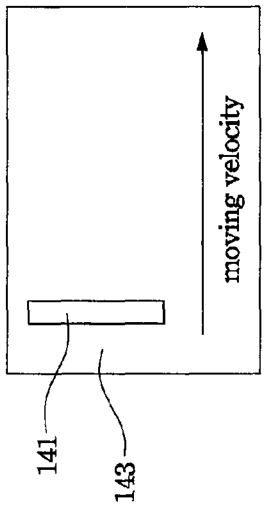
Fig. 1B (PRIOR ART)
FIG. 1B is a diagram of image comprising a white vertical light bar in the black frame.
Figure 1C:
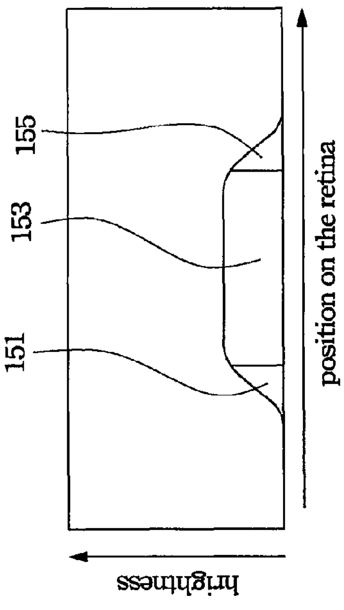
Fig. 1C (PRIOR ART)
FIG. 1C is a diagram of a simulation of the white vertical light bar on the retina by the way of the conventional colour field sequential.
Figure 2A:
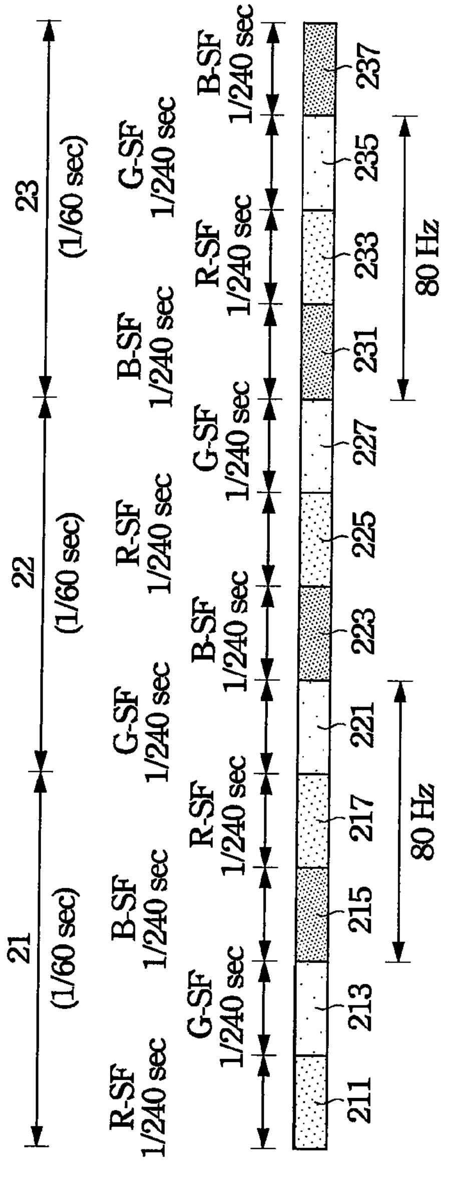
FIG. 2A is a diagram of field sequence arrangement of the first embodiment of the invention

When the frequency of the green light source is lower than 50 Hz the human eye senses the flicker. To prevent any conflict in the color compensation when arranging the field sequence, add a green light source subframe and then a white light source subframe to every frame to reduce the flicker sensed by the human eye, depress the color breakup and increase the light intensity of the image. The detailed description of the embodiment of the invention is as below:

In the first embodiment, as shown in FIG. 2A, the invention provides a driving method of a backlight which provides a red light source, a green light source and a blue light source. The driving method comprises assembling three continuous frames, each frame comprises at least four subframes, and the backlight lights one light source according with a corresponding subframe.

The backlight lights the red light source in the first subframe 211, lights the green light source in the second subframe 213, lights the blue light source in the third subframe 215 and lights the red light source in the fourth subframe 217 within the first frame 21. The order of lighting the light sources in the second frame 22 is continues in order from the first frame 21. Therefore the backlight lights the green light source in the first subframe 221, lights the blue light source in the second subframe 223, lights the red light source in the third subframe 225 and lights the green light source in the fourth subframe 227 within the second frame 22. The order of lighting the light sources in the third frame 23 is continues in order from the second frame 22. Therefore, the backlight lights the blue lights source in the first subframe 231, lights the red light source in the second subframe 233, lights the green light source in the third subframe 235, and lights the blue light source in the fourth subframe 237 within the third frame 23. And the lighting order among three continuous frames is repeated.

Conventionally, the frequency of the frame is 60 Hz, and the frequency of the subframe of the green light source is 60 Hz. However, according to the embodiment, because the frequency of the frame is 60 Hz and the frequency of the subframe is 240 Hz, the frequency of the subframe of the green light source is 80 Hz. In the embodiment, using the method may increase the frequency of the subframe of the green light source but maintain the frequency of the frame.

Figure 2B:
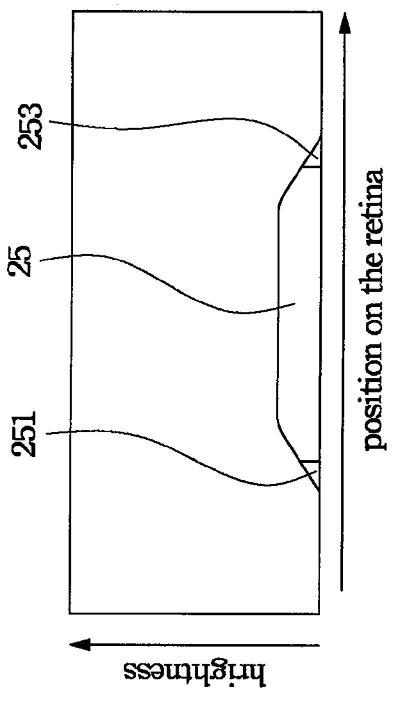
FIG. 2B is a diagram of simulation of the white vertical light bar on the retina by the way of the first embodiment of the invention.

According to the result of the experiment, as shown in FIG. 2B, the area of the non-white color band on the left edge 251 of the image 25 and on the right edge 253 of the image 25 is smaller than the area of the non-white color band on the left edge 151 of the image 15 and on the right edge 153 of the image 15. From the experiment, the effect of color breakup is reduced in the invention.

Figure 3A:
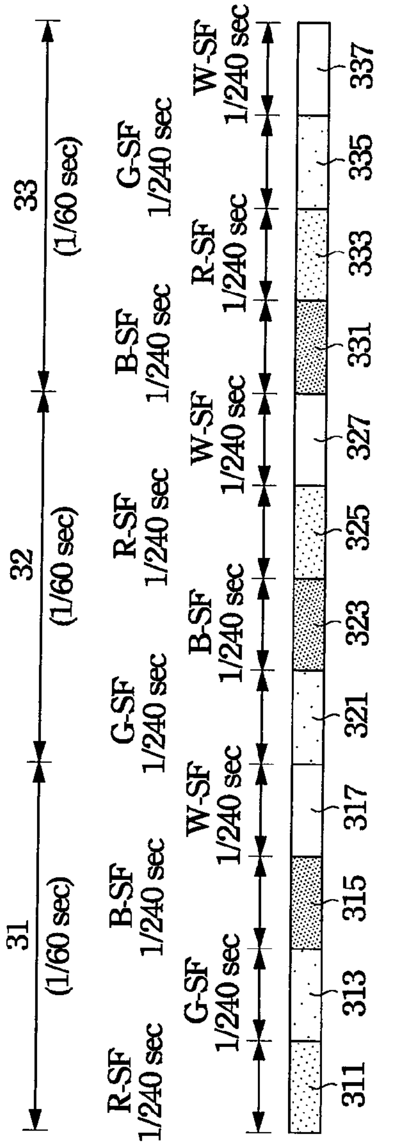
FIG. 3A is a diagram of field sequence arrangement of the second embodiment of the invention.

As shown in FIG. 3, according to the second embodiment of a driving method of a backlight (not shown), which provided a red light source, a blue light source, a green light source, and a compensational light source. The method comprises: assembling the first frame 31, the second frame 32, the third frame 33 into a lighting period 30. The backlight lights the red lights source in the first subframe 311, lights the green light source in the second subframe 313, lights the blue light source in the subframe 315 and lights the white light source in the fourth subframe 317 within the first frame 31. In the embodiment, the compensation light source is a white light source. The white light compensates the image so the light intensity of the image can be increased.

The backlight lights the green light source in the first subframe 321, lights the blue light source in the second subframe 323, lights the red light source in the third subframe 325 and lights the white light source in the fourth subframe 327 within the second frame 32. The order of lighting the light source in the third frame 33 continues in order from the second frame 32. Therefore the backlight lights the blue lights source in the first subframe 331, lights the red light source in the second subframe 333, lights the green light source in the third subframe 335 and lights the white light source in the fourth subframe 337 within the third frame 33. And the lighting order among three continuous frames is repeated.

A smoother image is generated by combining the three frames and changing the order of lighting the light source in the first subframe, the second subframe, and the third subframe in the first frame, the second frame, and the third frame, to get the compensation effect.

Figure 3B:
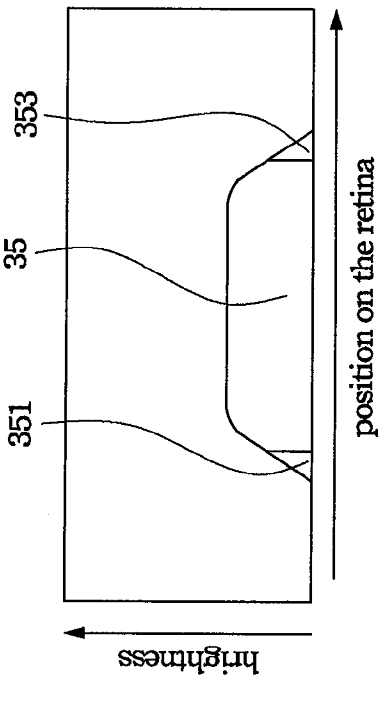
FIG. 3B is a diagram of simulation of the white vertical light bar on the retina by the way of the second embodiment of the invention.

According to the result of the experiment in the embodiment, as shown in the FIG. 3B, the area of the non-white color band at the left edge 351 of the image 35 and at the right edge 353 of the image 35 is smaller than the area of the non-white color band at the left edge 151 of the image 15 and at the right edge 153 of the image 15. From the experiment, the effect of color breakup is reduced in the invention.

Figure 4:
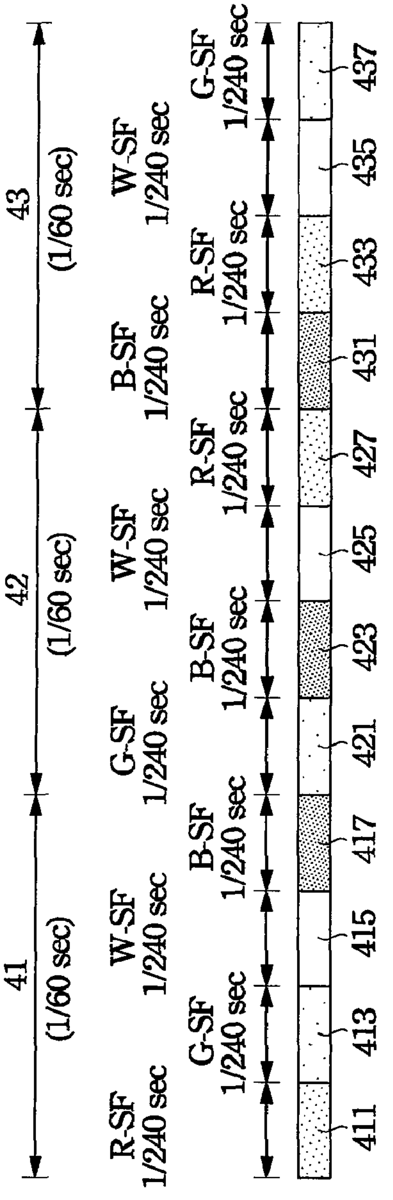
FIG. 4 is a diagram of field sequence arrangement of the third embodiment of the invention

In the third embodiment, the order of the compensation light source and the three subframes can be changed. As shown in FIG. 4, according to the third embodiment of a driving method of a backlight (not shown), which provides a red light source, a blue light source, a green light source, and a compensational light source. The method comprises: assembling the first frame 41, the second frame 42, the third frame 43 and the fourth frame 44 into a lighting period. The backlight lights the red light source in the first subframe 411, lights the green light source in the second subframe 413, lights the white light source in the subframe 415, and lights the blue light source in the fourth subframe 417 within the first frame 41. The backlight lights the green light source in the first subframe 421, lights the blue light source in the second subframe 423, lights the white light source in the third subframe 425, and lights the red light source in the fourth subframe 427 within the second frame 42. The order of lighting the light source in the third frame 43 continues in order from the second frame 42. The backlight lights the blue light source in the first subframe 431, lights the red light source in the second subframe 433 lights the white light source in the third subframe 435 and lights the green light source in the fourth subframe 437 within the third frame 43.

Figure 5:
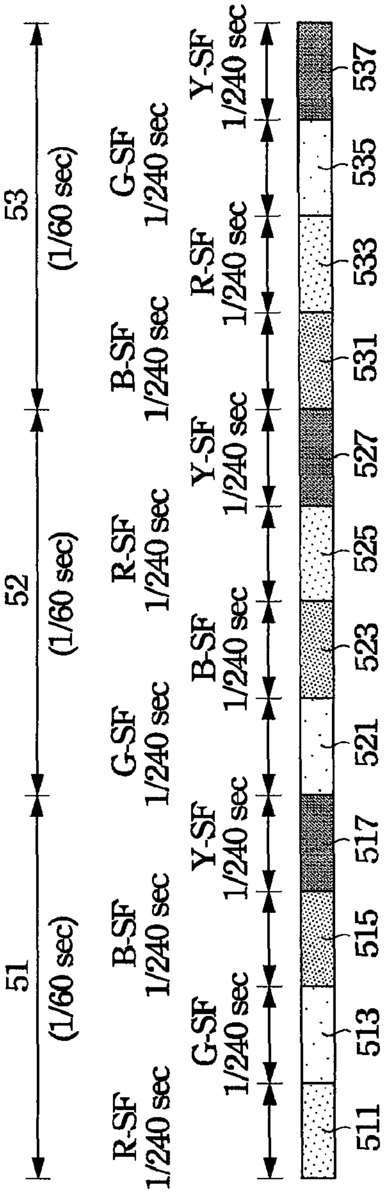
FIG. 5 is a diagram of field sequence arrangement of the fourth embodiment of the invention

In the fourth embodiment, the compensation light source can be a mixed color light source. In the embodiment the mixed light source is cyan which is a combination of the red light source and the green light source. As shown in FIG. 5, according to the fourth embodiment of a driving method of a backlight (not shown), which provides a red light source, a blue light source, a green light source and a compensational light source. The method comprises: assembling the first frame 51, the second frame 52, the third frame 53 and the fourth frame 54 into a lighting period. The backlight lights the red light source in the first subframe 511, lights the green light source in the second subframe 513, lights the blue light source in the subframe 515 and lights the cyan light source in the fourth subframe 517 within the first frame 51. The backlight light the green light source in the first subframe 521, lights the blue light source in the second subframe 523, lights the red light source in the third subframe 525 and lights the Magenta light source in the fourth subframe 527 within the second frame 52. The order of lighting the light source in the third frame 53 continues in order from the second frame 52. The backlight lights the blue light source in the first subframe 531, lights the red light source in the second subframe 533, lights the green light source in the third subframe 535 and lights the yellow light source in the fourth subframe 537 within the third frame 53.

Figure 6:
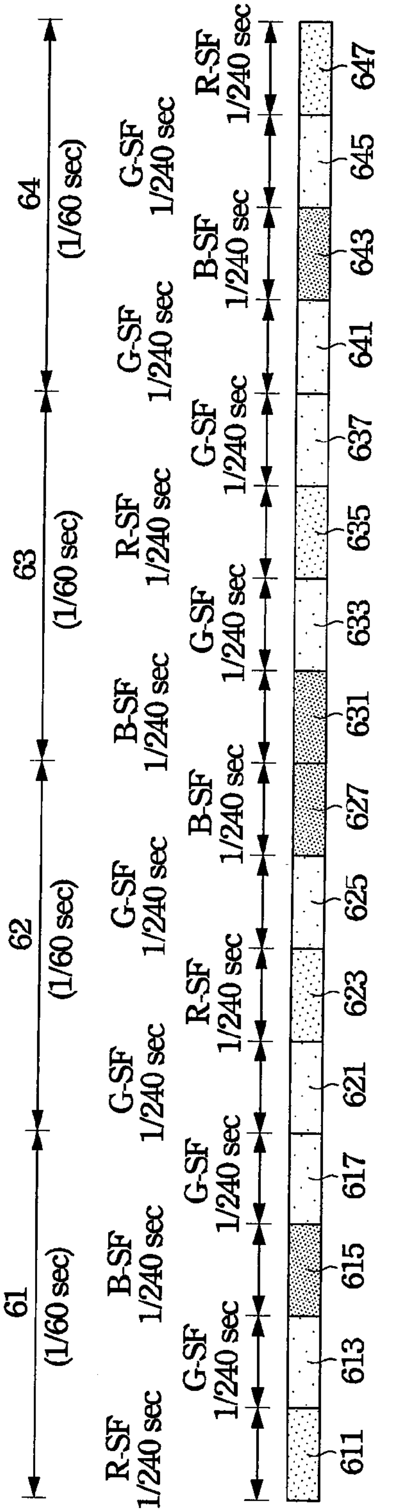
FIG. 6 is a diagram of field sequence arrangement of the fifth embodiment of the invention

In the fifth embodiment, we increase the frequency of the subframe of the green light source. As shown in FIG. 6, the backlight lights the red light source in the first subframe 611, lights the green light source in the second subframe 613, lights the blue light source in the subframe 615, and lights the green light source in the fourth subframe 617 within the first frame 61. The backlight lights the green light source in the first subframe 621, lights the red light source in the second subframe 623, lights the green light source in the third subframe 625 and lights the blue light source in the fourth subframe 627 within the first frame 62. The backlight lights the blue light source in the first subframe 631, lights the green light source in the second subframe 623, lights the red light source in the third subframe 635 and lights the green light source in the fourth subframe 637 within the third frame 63. The backlight lights the green lights source in the first subframe 641, lights the blue light source in the second subframe 643, lights the green light source in the third subframe 645 and lights the red light source in the fourth subframe 647 within the third frame 64.

In the embodiment, increasing the frequency of lighting the green light source can reduce the effect of the flicker observed by the human eye. And a smoother image is created when combining the four frames and changing the order of lighting the light source in the four frame also can achieve the advantage of light compensation.

Figure 7:
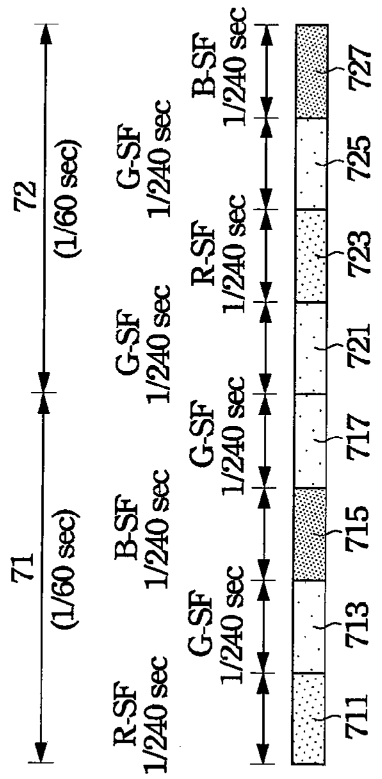
FIG. 7 is a diagram of field sequence arrangement of the sixth embodiment of the invention

In the sixth embodiment, as shown in FIG. 7, the lighting period comprises a first frame 71 and a second frame 72. The backlight lights the red light source in the first subframe 711, lights the green light source in the second subframe 713, lights the blue light source in the subframe 715, and lights the green light source in the fourth subframe 717 within the first frame 71. The backlight lights the green light source in the first subframe 721, lights the red light source in the second subframe 723, lights the green light source in the third subframe 725, and lights the blue light source in the fourth subframe 727 within the second frame 72.

To sum up, the method of the invention comprises dividing the frame into several subframes, in which the backlight lights a single light source. When the frequency of the subframe of lighting the green light source is lower than 50 Hz, the flicker may be found by the human eyes. Consequently the invention provides the method of increasing the subframes of lighting the green light source or the subframes of lighting the white light source to improve the problem, to depress the color breakup, and to increase the light intensity of the image.

Except for adding the compensation light source, changing the order of the R, G, B light source can help create a smooth image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight driving method which provides a red light source, a blue light source and a green light source comprises:

assembling four continuous frames into a lighting period, wherein the lighting period comprises four frames, a first frame, a second frame, a third frame, and a fourth frame into a lighting period, where each of the four frames comprising a first subframe, a second subframe, a third subframe and a fourth subframe sequentially; and using a first lighting order to light the three light sources in the four subframes within the first frame, using a second lighting order to light the three light sources in the four subframes within the second frame, using a third lighting order to light the three light sources in the four subframes within the third frame, using a fourth lighting order to light the three light sources in the four subframes within the fourth frame, wherein the first lighting order, the second lighting order, the third lighting order and the fourth lighting order are different to each other and the backlight lights the green light source twice within each frame of the four continuous frames, two subframes lighting the green light source are not contiguous within each frame.

2. The backlight driving method according to the claim 1, wherein the first lighting order comprises lighting a red light source first, lighting a green light source second, lighting the blue light source third, and lighting the green light source fourth; the second lighting order comprises lighting the green light source first, lighting the red light source second, lighting the green light source third, and lighting the blue light source fourth.

3. The backlight driving method according to claim 1, wherein the third lighting order comprises lighting the blue light source first, lighting the green light source second, lighting the red light source third and the lighting the green light source fourth; and the fourth lighting order comprises lighting the green light source first, lighting the blue light source second, lighting the green light source third, and lighting the red light source fourth.

4. The driving method according to claim 1, wherein a frequency of the continuous frames is not less than 50 Hz.

5. The driving method according to claim 1, wherein one light source from the red light source, the blue light source and the green light source is lighted at a time.

* * * * *